United States Patent
Huang et al.

(10) Patent No.: US 10,949,952 B2
(45) Date of Patent: Mar. 16, 2021

(54) PERFORMING DETAIL ENHANCEMENT ON A TARGET IN A DENOISED IMAGE

(71) Applicant: BEIJING KUANGSHI TECHNOLOGY CO., LTD., Beijing (CN)

(72) Inventors: Haibin Huang, Beijing (CN); Chi-Hao Wu, Beijing (CN)

(73) Assignee: BEIJING KUANGSHI TECHNOLOGY CO., LTD., Beijing (CN)

( * ) Notice: Subject to any disclaimer, the term of this patent is extended or adjusted under 35 U.S.C. 154(b) by 140 days.

(21) Appl. No.: 16/212,289

(22) Filed: Dec. 6, 2018

(65) Prior Publication Data

US 2019/0378247 A1    Dec. 12, 2019

(30) Foreign Application Priority Data

Jun. 7, 2018   (CN) .......................... 201810583369.8

(51) Int. Cl.
*G06T 5/00*   (2006.01)

(52) U.S. Cl.
CPC .............. *G06T 5/002* (2013.01); *G06T 5/003* (2013.01); *G06T 2207/20024* (2013.01); *G06T 2207/20081* (2013.01); *G06T 2207/20221* (2013.01)

(58) Field of Classification Search
CPC ........... G06T 5/002; G06T 2207/20221; G06T 5/003; G06T 2207/20081
See application file for complete search history.

(56) References Cited

U.S. PATENT DOCUMENTS

| | | | |
|---|---|---|---|
| 2002/0172419 A1 | 11/2002 | Lin et al. | |
| 2008/0056612 A1* | 3/2008 | Park | G06K 9/36 382/284 |
| 2009/0002514 A1 | 1/2009 | Steinberg et al. | |

(Continued)

FOREIGN PATENT DOCUMENTS

| CN | 106056562 A | 10/2016 |
|---|---|---|
| CN | 106169181 A | 11/2016 |

(Continued)

OTHER PUBLICATIONS

European Search Report for European Patent Application No. 18210937.1, dated Jun. 18, 2019.

(Continued)

*Primary Examiner* — Casey L Kretzer
(74) *Attorney, Agent, or Firm* — Marshall, Gerstein & Borun LLP

(57) ABSTRACT

This disclosure provides an image processing method, an electronic device and a non-transitory computer-readable storage medium, and relates to the field of image processing technique. The image processing method and apparatus and the electronic device provided by this application perform denoising on the to-be-processed image to obtain a denoised image, and then perform detail enhancement on the target area image extracted from the denoised image to obtain a detail enhanced image, thereafter fuse the denoised image with the detail enhanced image to obtain an output image. Since detail enhancement has been performed on the target area image, the obtained output image is sharper and the display effect is better.

17 Claims, 3 Drawing Sheets

(56) References Cited

U.S. PATENT DOCUMENTS

| | | | |
|---|---|---|---|
| 2012/0044400 | A1 | 2/2012 | Okada et al. |
| 2017/0323465 | A1* | 11/2017 | Nakada .................. G06T 5/002 |
| 2017/0359498 | A1* | 12/2017 | Benchemsi .......... H04N 5/2355 |
| 2018/0130202 | A1 | 5/2018 | Wang et al. |
| 2018/0204051 | A1 | 7/2018 | Li et al. |
| 2018/0227538 | A1* | 8/2018 | Wang .................. G06K 9/00771 |
| 2018/0241929 | A1* | 8/2018 | Bouzaraa .......... H04N 5/23277 |
| 2019/0087648 | A1 | 3/2019 | Du |
| 2019/0108628 | A1* | 4/2019 | Sato .................. H04N 5/23219 |

FOREIGN PATENT DOCUMENTS

| | | | | |
|---|---|---|---|---|
| CN | 106204449 | A | * 12/2016 | .......... G06T 3/4076 |
| CN | 106204449 | A | 12/2016 | |
| CN | 107491771 | A | 12/2017 | |
| EP | 1788819 | A2 | 5/2007 | |
| JP | 2000184267 | A | * 6/2000 | |
| JP | 2004021374 | A | 1/2004 | |
| JP | 2008165312 | A | 7/2008 | |
| JP | 2012044564 | A | 3/2012 | |
| JP | 2019534763 | A | 12/2019 | |
| KR | 10-2012-0019164 | A | 3/2012 | |
| KR | 10-2012-0028760 | A | 3/2012 | |
| KR | 20120019164 | A | 3/2012 | |
| KR | 10-2015-0115681 | A | 10/2015 | |
| WO | WO2017177902 | A1 | * 10/2017 | ......... G06K 9/00771 |
| WO | WO-2018/048507 | A1 | 3/2018 | |

OTHER PUBLICATIONS

Xiao-Jiao Mao et al: "Image Restoration Using Very Deep Convolutional Encoder-Decoder Networks with Symmetric Skip Connections", 29th Conference on Neural Information Processing Systems (NIPS 2016),, Mar. 30, 2016 (Mar. 30, 2016), pp. 1-9, XP055516211, Barcelona, Spain. Retrieved from the Internet: URL:https://arxiv.org/pdf/1603.09056.pdf [retrieved on Oct. 17, 2018].

Lore Kin Gwn et al: "LLNet: A deep autoencoder approach to natural low-light image enhancement", Pattern Recognition, Elsevier, GB, vol. 61, Jun. 15, 2016 (Jun. 15, 2016), pp. 650-662, XP029761044, ISSN: 0031-3203, DOI: 10.1016/J.PATCOG.2016.06.008.

Japanese Office Action with Translation for Application No. 2018-225453, dated Feb. 12, 2020.

Xiao-Jiao Mao,Image Denoising Using Very Deep Fully Convolutional Encoder-Decoder Networks with Symmetric Skip Connections,CoRP, Japan, Mar. 30, Cornell University,2016, pp. 1 to p. 15,arXiv:1603.09056v1,URL,http://arxiv.org/abs/1603.09056v1.

Vijay Badrinarayanan,SegNet:A Deep Convolutional Encoder-Decoder Architecture for Robust Semantic Pixel—Wise Labelling,Corp, United States, May 27, Cornell University,2015, arXiv:1505.07293v1,URL,http://arxiv.org/abs/1505.07293.

Korean Office Action with Translation for Application No. 10-2018-0147265, dated Feb. 12, 2020.

Ding Liu et al: "When Image Denoising Meets High-Level Vision Tasks: A Deep Learning Approach", CS Computer Vision and Pattern Recognition (arXiv:1706.04284v3), and Apr. 16, 2018(Apr. 16, 2018).

Hyeonwoo Noh et al: "Learning Deconvolution Network for Semantic Segmentation", the IEEE International Conference on Computer Vision (ICCV), 2015, pp. 1520-1528, and Dec. 13-16, 2015(Dec. 13, 2015).

Xiaojiao Mao et al: "Image Restoration Using Very Deep Convolutional Encoder-Decoder Networks with Symmetric Skip Connections", the Advances in Neural Information Processing Systems 29 (NIPS 2016), and Dec. 5-10, 2016(Dec. 5, 2016).

Learning a Deep Single Image Contrast Enhancer from Multi-Exposure Images IEEE Transactions on Image Processing, vol. 27, Issue:4, the pp. 2049-2062, and the Apr. 2018(Apr. 30, 2018).

First Office Action issued by the Chinese Patent Office in the corresponding Chinese application No. 201810583369.8, dated Mar. 16, 2020 with an English translation.

* cited by examiner

PERFORMING DETAIL ENHANCEMENT ON A TARGET IN A DENOISED IMAGE

CROSS-REFERENCE TO RELATED APPLICATION

The present application claims the priority of Chinese Patent Application No. 201810583369.8 filed on Jun. 7, 2018, the disclosure of which is incorporated herein by reference in its entirety.

TECHNICAL FIELD

The present disclosure relates to the field of image processing technique, and more particularly, to an image processing method, an electronic device and a non-transitory computer-readable recording medium.

BACKGROUND

Pictures taken by electronic devices such as smart phones in the case of insufficient light often have more local noise and loss of details of the shooting subject or the like. As for pictures taken by electronic devices in a dark environment, the current image processing technique usually uses a noise reduction method to remove parts of the noise in the pictures, but the existing noise reduction method has a strong sense of smearing and cannot restore details of key parts of the images, which thus cause image distortion.

SUMMARY

In view of this, the objectives of the present disclosure are to provide an image processing method and apparatus, and an electronic device, which can improve image sharpness and make improvement with respect to image distortion caused by the existing noise reduction method.

An embodiment of the present disclosure provides an image processing method, comprising: performing denoising on a to-be-processed image to generate a denoised image; extracting a target area image corresponding to a shooting target from the denoised image; performing detail enhancement on the target area image to generate a detail enhanced image; and fusing the denoised image with the detail enhanced image to obtain an output image.

The embodiment of the present disclosure further provides an image processing apparatus, comprising: a denoising module configured to perform denoising on a to-be-processed image to generate a denoised image; a target extraction module configured to extract a target area image corresponding to a shooting target from the denoised image; a detail enhancement module configured to perform detail enhancement on the target area image to generate a detail enhanced image; and a fusion module configured to fuse the denoised image with the detail enhanced image to obtain an output image.

The embodiment of the present disclosure further provides an electronic device, comprising an image acquisition assembly, a memory and a processor; the image acquisition assembly is configured to acquire image data; the memory stores thereon a computer program capable of being executed on the processor, wherein steps of the method according to any implementation of the first aspect are carried out when the computer program is executed by the processor.

The embodiment of the present disclosure further provides a non-transitory computer-readable storage medium having stored thereon a computer program, wherein steps of the method as stated above are carried out when the computer program is executed by a processor.

The embodiments of the present disclosure bring the following beneficial effects.

The image processing method and apparatus and the electronic device provided by the embodiments of the present disclosure perform denoising on the to-be-processed image to obtain a denoised image, and then perform detail enhancement on the target area image extracted from the denoised image to obtain a detail enhanced image, thereafter fuse the denoised image with the detail enhanced image to obtain an output image. Since detail enhancement has been performed on the target area image, improvement has been made with respect to the image distortion problem caused by the existing noise reduction method, and the obtained output image is sharper and the display effect is better.

Other features and advantages of the present disclosure will be set forth in the description which follows, or parts of the features and advantages may be deferred from the specification or be determined undoubtedly therefrom or be learned by implementing the above techniques of the present disclosure.

For the above described objectives, features and advantages of the present disclosure to be more apparent and understandable, preferred embodiments will be illustrated below in combination with the drawings, so as to provide detailed explanation as follows.

BRIEF DESCRIPTION OF THE DRAWINGS

In order to more clearly illustrate the specific implementations of the present disclosure or the technical solutions in the prior art, drawings necessary for describing the specific implementations or the prior art will be briefly introduced below, obviously, the following drawings are parts of the implementations of the present disclosure, and for a person of ordinary skill in the art, it is possible to attain other drawings based on these drawings without paying creative effort.

DETAILED DESCRIPTION OF THE EMBODIMENTS

To make the objectives, technical solutions, and advantages of the present disclosure be more clear and obvious, hereinafter, the technical solutions of the present disclosure will be described clearly and comprehensively in combination with the drawings, obviously, these described embodiments are parts of the embodiments of the present disclosure, rather than all of the embodiments thereof. All the other embodiments obtained by a person of ordinary skill in the art based on the embodiments of the present disclosure without paying creative efforts fall into the protection scope of the present disclosure. The following is the detailed description of the embodiments of the present disclosure.

First, an exemplary electronic system 100 for implementing an image processing method and apparatus according to an embodiment of the present disclosure will be described with reference to FIG. 1.

Figure 1:
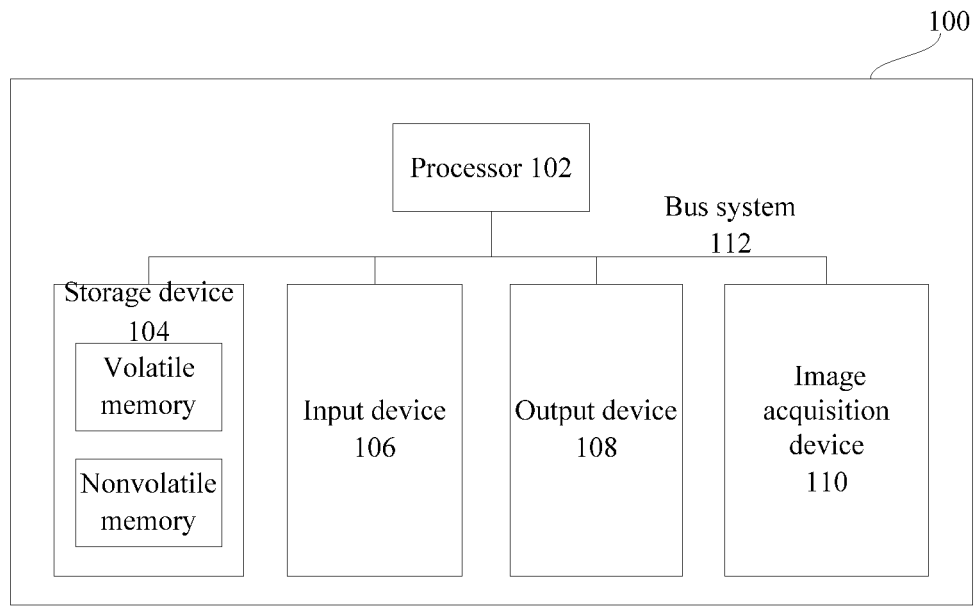
FIG. 1 shows a schematic structural diagram of an electronic device according to an embodiment of the present disclosure.

As shown in FIG. 1, the electronic system 100 comprises one or more processors 102, one or more storage devices 104, an input device 106, an output device 108 and an image acquisition device 110, these components are interconnected through a bus system 112 and/or other forms of connection mechanisms (not shown). It should be noted that, components and structures of the electronic system 100 shown in FIG. 1 are merely exemplary, not restrictive, and the electronic system may have other components and structures as needed.

The processor 102 may be a central processing unit (CPU) or other forms of processing unit with data processing capability and/or instruction execution capability, and can control other components in the electronic device 100 to perform desired functions.

The storage device 104 may include one or more computer program products, said computer program products may include various forms of computer-readable storage medium, such as a volatile memory and/or a nonvolatile memory. The volatile memory may include, for example, a random access memory (RAM) and/or a cache or the like. The nonvolatile memory may include, for example, a read only memory (ROM), a hard disk, a flash memory or the like. One or more computer program instructions may be stored on the computer-readable storage medium, and the processor 102 may execute the program instructions to implement client functions (implemented by the processor) in embodiments of the present disclosure described below and/or other desired functions. Various application programs and various data may also be stored in the computer-readable storage medium, such as various data used and/or generated by the application programs or the like.

The input device 106 may be a device used by a user to input an instruction, and may include one or more of a keyboard, a mouse, a microphone, a touch screen or the like.

The output device 108 may output various types of information (e.g., image or sound) to the outside (e.g., a user), and may include one or more of a display, a speaker or the like.

The image acquisition device 110 may capture images (e.g., photos, videos, etc.) desired by the user and store the captured images in the storage device 104 for use by other components.

Illustratively, the exemplary electronic system for implementing the image processing method and apparatus according to an embodiment of the present disclosure may be implemented as the mobile terminals such as smart phones, tablet computers, and so on.

This embodiment provides an image processing method, it should be noted that the steps shown in the flowchart of the drawings may be executed in a computer system by running, for example, a set of computer-executable instructions, and although the steps are presented in a logical order in the flowchart, in some situations, the steps shown or described may be executed in an order different from the ones described herein. This embodiment is described in detail below.

Figure 2:
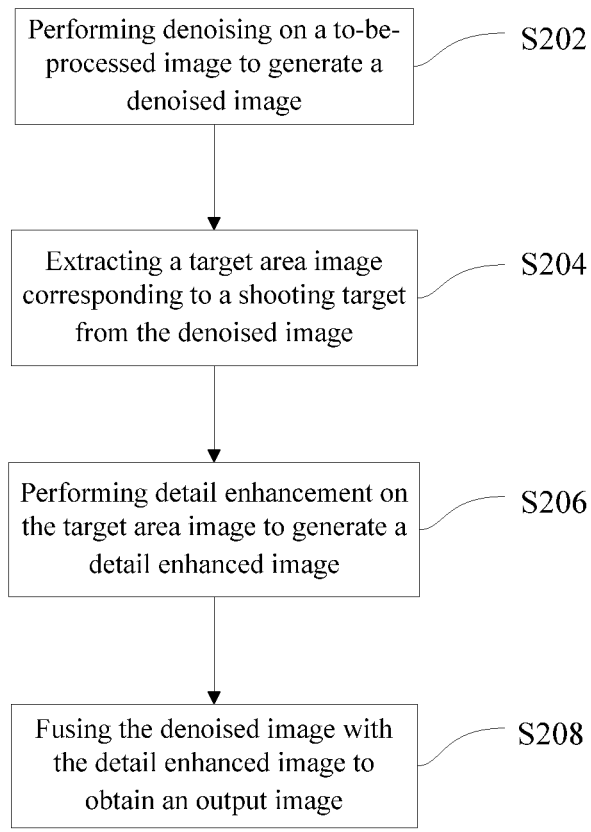
FIG. 2 shows a flowchart of an image processing method according to an embodiment of the present disclosure.

FIG. 2 shows a flowchart of an image processing method according to an embodiment of the present disclosure, as shown in FIG. 2, the method comprises the following steps.

Step S202, denoising is performed on a to-be-processed image to generate a denoised image.

The to-be-processed image may be an image captured by an electronic device such as a smart phone or an electronic camera. For example, if the shooting environment is dark, a dark light image taken by a photosensitive element of the electronic device in the case of insufficient light usually has more local noise and loss of details of the captured object. The image processing method provided by the embodiment of the present disclosure may be used to process the above-mentioned dark light image so as to obtain a sharper image.

Optionally, the image captured by the electronic device may be used as the to-be-processed image, and be processed by the image processing method provided by the embodiment of the present disclosure. In order to save power of the electronic device and speed up photographing of the electronic device, it is also possible to use only the blurred image that needs to be sharpened as the to-be-processed image, such as a dark light image. For example, when taking a photo with an electronic device, it may be first determined whether a light brightness in the current shooting environment is less than a set brightness threshold. Specifically, the light brightness in the current shooting environment can be perceived by a photosensitive element (e.g., a photosensitive sensor). If the light brightness in the current shooting environment is less than the set brightness threshold, the image currently captured by the electronic device is considered to be a dark light image, and the dark light image is used as the to-be-processed image to subject to image processing.

Optionally, the to-be-processed image may be subjected to noise reduction through a pre-trained noise reduction network. The to-be-processed image is inputted into the noise reduction network to obtain a denoised image outputted by the noise reduction network, and the denoised image has the same size as the to-be-processed image. The noise reduction network may use a convolution-deconvolution neural network shown in FIG. 3. The convolution-deconvolution neural network includes a convolution neural network and a deconvolution neural network. Herein, the convolution neural network and the deconvolution neural network may adopt a symmetrical structure.

The convolution neural network is used to reduce the noise of the to-be-processed image, and obtain a denoised feature map of the to-be-processed image. The deconvolution neural network is used to map the denoised feature map to a size of the to-be-processed image, and obtain a denoised image of the same size as the to-be-processed image.

Illustratively, the convolution neural network of the noise reduction network includes at least one convolution layer, each of the at least one convolution layer includes one or more first convolution kernels for reducing image noise from a pixel matrix of the input image and extracting useful information, the pixel matrix of the input image is traversed by the first convolution kernels according to a certain step size to obtain at least one denoised feature value, and the at least one denoised feature value constitutes the denoised feature map. The input image of the first convolution layer is the to-be-processed image, and the input image of the remaining convolution layer is the output image of the previous convolution layer. The deconvolution operation is the inverse of the convolution operation, the deconvolution neural network of the noise reduction network may adopt a structure symmetric with the convolution neural network, the deconvolution neural network includes at least one deconvolution layer, and each of the at least one deconvolution layer may include second convolution kernels whose number is the same as the corresponding convolution layers, a denoised image of the same size as the to-be-processed image can be obtained after going through the deconvolution layers.

Figure 3:
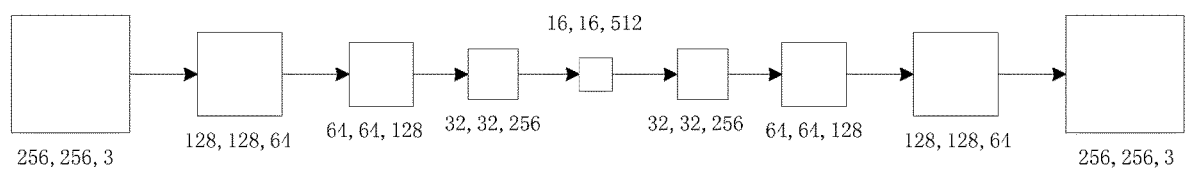
FIG. 3 shows a schematic structural diagram of a convolution-deconvolution neural network according to an embodiment of the present disclosure.

For example, as shown in FIG. 3, a to-be-processed image having a size 256*256*3 is inputted into a noise reduction network, then a 16*16*512 denoised feature map is obtained after going through a convolution neural network, a 256*256*3 denoised image can be obtained after the denoised feature map passes through the deconvolution neural network.

Step S204, a target area image corresponding to a shooting target is extracted from the denoised image.

In the embodiment of the present disclosure, the shooting target may be a pedestrian, may be a certain part of a human body (such as a face), and may be an animal or any object, for example, a certain landmark building, some iconic logo, and the like, this embodiment makes no limitations thereto.

In an optional embodiment, the area where the shooting target resides in the denoised image may be determined by a target extraction network; the target extraction network may adopt a convolution neural network having the following structure, the convolution neural network includes a convolution layer, a deep residual network, a region proposal network, an interest area pooling layer and a fully connected layer that are successively connected. Optionally, the target extraction network may include: a convolution layer, a plurality of depth residual networks, a region proposal network, an interest area pooling layer, and a fully connected layer.

For example, if the shooting target is a person's face, the target extraction network may employ a pre-trained convolution neural network for recognizing facial features. A rectangular sliding window is used to slide on the denoised image according to a certain step size, and the image in the sliding window is used as an input of the convolution neural network; if the output of the convolution neural network is 0, it means that no human face is detected; if the output of the convolution neural network is 1, it means that human face is detected. The area where the human face is located is determined as the area where the shooting target resides, and the area where the shooting target resides is isolated from the denoised image to obtain the target area image.

It should be noted that the target area image extracted from the denoised image may be one or multiple. For example, if multiple human faces are included in the denoised image, multiple target area images may be extracted.

Step S206, detail enhancement is performed on the target area image to generate a detail enhanced image.

The target area image is inputted to a pre-trained detail enhancement network, and the output of the detail enhancement network is used as the detail enhanced image. The detail enhancement network may also adopt the convolution-deconvolution neural network shown in FIG. 3, and the detail enhanced image outputted by the detail enhancement network is of the same size as the target area image.

Similar to the network structure of the noise reduction network, the detail enhancement network may also include a convolution neural network and a deconvolution neural network. The convolution neural network and the deconvolution neural network may adopt a symmetrical structure.

The convolution neural network is used to extract detail features of the target area image, and obtain a detail feature map. The deconvolution neural network is used to map the detail feature map to a size of the target area image, and obtain a detail enhanced image of the same size as the to-be-processed image.

Illustratively, the convolution neural network of the detail enhancement network includes at least one convolution layer, each of the at least one convolution layer includes one or more first convolution kernels for extracting detail feature information from a pixel matrix of the input image, the pixel matrix of the input image is traversed by the convolution kernels according to a certain step size to obtain at least one detail feature value, and the at least one detail feature value constitutes the detail feature map. The input image of the first convolution layer is the target area image, and the input image of the remaining convolution layer is the output image of the previous convolution layer. The deconvolution neural network of the detail enhancement network may adopt a structure symmetric with the convolution neural network, and each layer of the at least one deconvolution layer may include convolution kernels whose number is the same as the corresponding convolution layers, a detail enhanced image of the same size as the target area image may be obtained after passing through the deconvolution layer.

If a plurality of target area images are extracted from the denoised image, each target area image may be separately inputted into the detail enhancement network to obtain a corresponding detail enhanced image; that is, corresponding to a plurality of target area images, a plurality of detail enhanced images are obtained.

Step S208, the denoised image is fused with the detail enhanced image to obtain an output image.

The detail enhanced image may be used to replace the target area image in the denoised image; a boundary area where the detail enhanced image intersects the denoised image is linearly fused, so that a sharper output image can be obtained.

The above process of replacing the target area image in the denoised image with the detail enhanced image may be expressed by the following formula:

$$R\_final = aR\_206 + (1-a)R\_202$$

where R_final is the output image, R_206 is the detail enhanced image obtained in step S206, R_202 is the denoised image obtained in step S202, a is the area where the target area image resides in the denoised image, 1−a is other area than the target area image in the denoised image.

The boundary area where the detail enhanced image intersects the denoised image may be linearly fused by means of smoothing filtering or wavelet reconstruction.

Optionally, if there are a plurality of detail enhanced images, each of the detail enhanced images is used to replace the corresponding target area image in the denoised image, and then the boundary area where each detail enhanced image intersects with the denoised image is linearly fused, thus a sharper output image is obtained.

In order to enable the noise reduction network, the target extraction network and the detail enhancement network mentioned above to be directly applied to detail enhancement of images and output more accurate and reliable results, it is necessary to train the noise reduction network, the target extraction network and the detail enhancement network in advance. The training process of the noise reduction network, the target extraction network and the detail enhancement network is described in detail below.

A training image sample set is obtained, the training image sample set includes a plurality of groups of paired training images; each group of paired training images comprises a first image and a second image respectively acquired in the same shooting environment. The first image may also be referred to as an initial image, and the second image may also be referred to as a sharp image. The initial image is captured according to a set first exposure time and a set first sensitivity parameter; the sharp image is captured according to a set second exposure time and a set second sensitivity parameter. The second exposure time is greater than the first exposure time; the second sensitivity parameter is smaller than the first sensitivity parameter.

For example, when the shooting environment is dark, the initial image is captured by the electronic device using normal shooting parameters (including the first exposure time and the first sensitivity parameter). Since the light received by the photosensitive element of the electronic device is insufficient, the initial image has a lot of noise, and there is a phenomenon that the details of the captured object are lost. In order to obtain a sharp image under dark light, in the same shooting environment, the exposure time when the electronic device captures an image is increased to increase the amount of light entering. The sensitivity parameter is lowered in cooperation while increasing the exposure time, so as to prevent overexposure. That is, a sharp image is captured according to the set second exposure time and the set second sensitivity parameter. For example, the second exposure time may be 4 to 8 times the first exposure time. The second sensitivity parameter may be greater than a set minimum value and less than the first sensitivity parameter. A plurality of pairs of training images can be obtained by the above method to form a training image sample set.

When training the noise reduction network, the target extraction network or the detail enhancement network, a pair of training images is randomly selected from the training image sample set, and the initial image contained therein is inputted into the noise reduction network. The initial image is first subjected to a convolution neural network of the noise reduction network, so as to obtain a denoised feature map of the initial image; the denoised feature map includes at least one denoised feature value. Thereafter, going through the deconvolution neural network, the denoised feature map of the initial image is mapped to a size of the initial image, so as to obtain a denoised image of the initial image. The shooting target area where the target resides in the denoised image of the initial image is determined by the target extraction network, so as to obtain a target area image of the initial image. The target area image of the initial image is inputted to the detail enhancement network. The target area image of the initial image first passes through the convolution neural network of the detail enhancement network, so as to obtain a detailed feature map corresponding to the target area image of the initial image; then it passes through the deconvolution neural network, the detailed feature map is mapped to a size of the target area image, and the detail enhanced image corresponding to the target area image of the initial image is obtained. The detail enhanced image is fused with the denoised image of the initial image to obtain an output image corresponding to the initial image.

The output image corresponding to the initial image is compared with the sharp image, and the parameters in the noise reduction network, the target extraction network and the detail enhancement network are further adjusted until an error between the output image corresponding to the initial image and the sharp image is less than a set error, thereby the training of the noise reduction network, the target extraction network and the detail enhancement network is completed, and the current parameters are used as parameters of the noise reduction network, the target extraction network and the detail enhancement network.

The image processing method provided by the embodiment of the present disclosure performs denoising on the to-be-processed image to obtain a denoised image, and then performs detail enhancement on the target area image extracted from the denoised image to obtain a detail enhanced image, thereafter fuses the denoised image with the detail enhanced image to obtain an output image. Since detail enhancement has been performed on the target area image, the obtained output image is sharper and the display effect is better. Especially when processing the dark light image, missing details in the dark light image can be supplemented and enhanced to improve sharpness of the image.

Both the noise reduction network and the detail enhancement network in the embodiment of the present disclosure use a convolution-deconvolution neural network, which the effects of noise reduction and detail enhancement are enhanced, and the efficiency of image processing is improved. At the same time, the embodiment of the present disclosure obtains a sharp image under dark light by adjusting the shooting parameters, the sharp image and the initial image constitute paired training images, so as to train the noise reduction network, the target extraction network and the detail enhancement network, accuracy of respective parameters in the noise reduction network, the target extraction network and the detail enhance the network can be improved.

Figure 4:
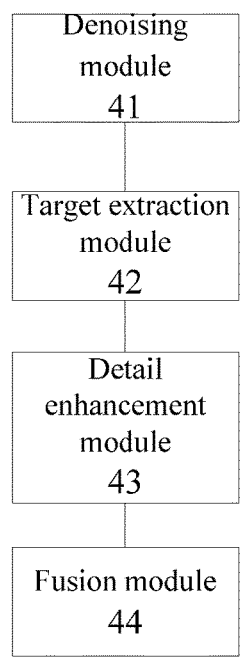
FIG. 4 shows a structural block diagram of an image processing apparatus according to an embodiment of the present disclosure.

Corresponding to the image processing method provided in the second embodiment, this embodiment provides an image processing apparatus, FIG. 4 shows a structural block diagram of an image processing apparatus according to an embodiment of the present disclosure, as shown in FIG. 4, the apparatus comprises the following modules:

a denoising module 41 configured to perform denoising on a to-be-processed image to generate a denoised image;

a target extraction module 42 configured to extract a target area image corresponding to a shooting target from the denoised image;

a detail enhancement module 43 configured to perform detail enhancement on the target area image to generate a detail enhanced image; and a fusion module 44 configured to fuse the denoised image with the detail enhanced image to obtain an output image.

Herein, the denoising module 41 may be further configured to input the to-be-processed image into a noise reduction network, using an output of the noise reduction network as the denoised image; the noise reduction network employing a convolution-deconvolution neural network; the denoised image and the to-be-processed image having the same size. the convolution-deconvolution neural network includes a convolution neural network and a deconvolution neural network; the convolution neural network includes at least one convolution layer, each of the at least one convolution layer includes one or more first convolution kernels, and a denoised feature map is obtained after the first convolution kernels traverse a pixel matrix of the to-be-processed image; the deconvolution neural network employs a structure symmetrical with the convolution neural network, the deconvolution neural network includes at least one deconvolution layer, each of the at least one deconvolution layer includes second convolution kernels whose number is the same as the corresponding convolution layers, and the denoised image is obtained after the second convolution kernels traverse a feature matrix of the denoised feature map.

The target extraction module 42 may be further configured to determine by a target extraction network, an area where the shooting target resides in the denoised image; the target extraction network employing a convolution neural network; and isolate the area where the shooting target resides from the denoised image to obtain the target area image.

The detail enhancement module 43 may be further configured to input the target area image into a detail enhancement network, and use an output of the detail enhancement network as the detail enhanced image; the detail enhancement network employing a convolution-deconvolution neural network; the detail enhanced image and the target area image having the same size.

The fusion module 44 may be further configured to replace the target area image in the denoised image with the detail enhanced image; and linearly fuse a boundary area where the detail enhanced image intersects the denoised image.

Furthermore, the image processing apparatus may further comprise a training module. The training module is connected to the denoising module, and configured to obtain a training image sample set, the training image sample set including a plurality of groups of paired training images; and training the noise reduction network, the target extraction network, or the detail enhancement network by using the training image sample set. Herein, each group of paired training images comprises: a first image and a second image respectively acquired in the same shooting environment; the step of acquiring the first image comprises capturing the first image according to a set first exposure time and a first sensitivity parameter; the step of acquiring the second image comprises capturing the second image according to a set second exposure time and a second sensitivity parameter; the second exposure time is greater than the first exposure time; the second sensitivity parameter is smaller than the first sensitivity parameter.

Optionally, the image processing apparatus may further comprise a determining module connected between the training module and the denoising module 41, and configured to determine whether a light brightness in a current shooting environment is less than a set brightness threshold; if yes, use the captured image as the to-be-processed image.

The implementation principle of and the technical effects produced by the apparatus provided in this embodiment are the same as those in the foregoing embodiment. For the sake of briefness, as for those not mentioned in the apparatus embodiment, reference may be made to the corresponding content in the foregoing method embodiment.

The image processing apparatus provided by the embodiments of the present disclosure performs denoising on the to-be-processed image to obtain a denoised image, and then performs detail enhancement on the target area image extracted from the denoised image to obtain a detail enhanced image, thereafter fuses the denoised image with the detail enhanced image to obtain an output image. Since detail enhancement has been performed on the target area image, improvement has been made with respect to the image distortion problem caused by the existing noise reduction method, and the obtained output image is sharper and the display effect is better.

In addition, an embodiment of the present disclosure provides an electronic device, comprising an image acquisition assembly, a memory and a processor; the image acquisition assembly is configured to acquire image data; the memory stores thereon a computer program capable of being executed on the processor, wherein steps of the method according to the foregoing method embodiments are carried out when the computer program is executed by the processor.

Figure 5:
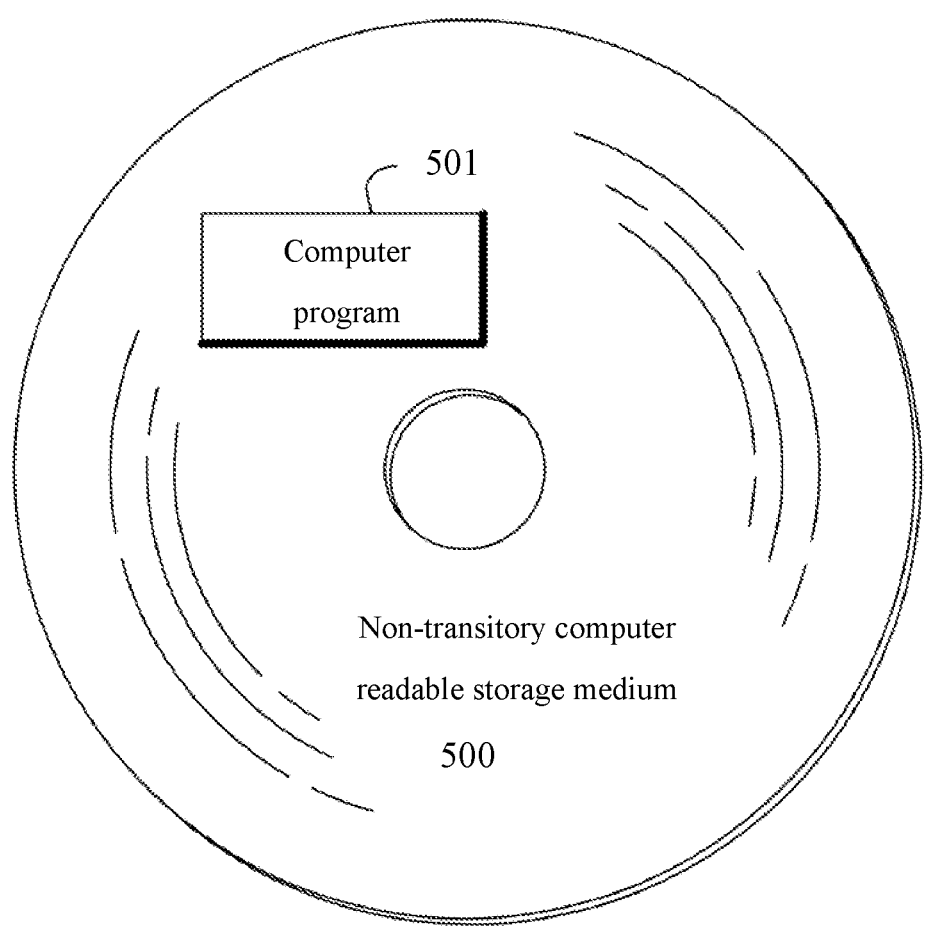
FIG. 5 shows a schematic diagram of a non-transitory computer readable storage medium according to an embodiment of the present disclosure.

Furthermore, as shown in FIG. 5, this embodiment further provides a non-transitory computer-readable storage medium 500 having stored thereon a computer program 501, wherein steps of the method provided above in the foregoing method embodiments are executed when the computer program 501 is run by a processing device.

The computer program product of the image processing method and apparatus provided by the embodiments of the present disclosure includes a computer-readable storage medium storing program codes, and the program codes include instructions for executing the method described in the above method embodiments. As for specific implementations, reference may be made to the method embodiments, details are not repeated herein.

The above functions may also be stored in one computer-readable storage medium when being implemented in the form of a software functional module and sold and used as an independent product. Based on such understanding, the substance or the part that contributes to the prior art of the technical solutions of the present disclosure or the technical solution part may be reflected in the form of a software product, the computer software product may be stored in one storage medium, and include several instructions for causing a computer device (which may be a personal computer, a server, or a network device) to fully or partially perform the method described in the various embodiments of the present disclosure. The aforesaid storage medium includes various mediums capable of storing program codes like a mobile storage device, a Read Only Memory (ROM), a magnetic disk, or an optical disk.

Last, it should be noted that, the above embodiments are merely specific implementations adopted for explaining the technical solutions of the present disclosure, rather than limiting the present disclosure, the protection scope of the present disclosure is not limited thereto. Although the present disclosure has been described in detail with reference to the above embodiments, a person of ordinary skill in the art should understand that, within the technical scope revealed by the present disclosure, various modifications may also be made to the technical solutions recorded in the preceding embodiments or changes may be made thereto easily, or parts of the technical features thereof may be replaced by equivalents, and essence of the corresponding technical solutions with these modifications or replacements still falls into the spirit and scope of the technical solutions in the embodiments of the present disclosure. These modifications, changes, and substitutions do not make the corresponding technical solutions depart from the spirit and scope of the technical solutions in the embodiments of the present disclosure, they should be within the protection scope of the present disclosure. Therefore, the protection scope of the present disclosure should be determined by the scope of the appended claims.

What is claimed is:

1. An image processing method, comprising:
obtaining a training image sample set, the training image sample set including a plurality of groups of paired training images;
training a noise reduction network, a target extraction network, or a detail enhancement network by using the training image sample set;
wherein each group of paired training images comprises: a first image and a second image respectively acquired in the same shooting environment, and wherein the first image is captured according to a set first exposure time and a set first sensitivity parameter; the second image is captured according to a set second exposure time and a set second sensitivity parameter; the second exposure time is greater than the first exposure time; the second sensitivity parameter is smaller than the first sensitivity parameter;

determining whether a light brightness in a current shooting environment is less than a set brightness threshold; and if yes, using a captured image as a to-be-processed image;

performing, by the noise reduction network, denoising on the to-be-processed image to generate a denoised image;

extracting, by the target extraction network, a target area image corresponding to a shooting target from the denoised image;

performing, by the detail enhancement network, detail enhancement on the target area image to generate a detail enhanced image; and fusing the denoised image with the detail enhanced image to obtain an output image.

2. The method according to claim 1, wherein the step of performing denoising on a to-be-processed image to generate a denoised image comprises:

inputting the to-be-processed image into the noise reduction network; and using an output of the noise reduction network as the denoised image;

the noise reduction network employing a convolution-deconvolution neural network, and the denoised image and the to-be-processed image having the same size.

3. The method according to claim 2, wherein the convolution-deconvolution neural network includes a convolution neural network and a deconvolution neural network;

wherein the convolution neural network includes at least one convolution layer, each of the at least one convolution layer includes one or more first convolution kernels, and a denoised feature map is obtained after the first convolution kernels traverse a pixel matrix of the to-be-processed image;

wherein the deconvolution neural network employs a structure symmetrical with the convolution neural network, the deconvolution neural network includes at least one deconvolution layer, each of the at least one deconvolution layer includes second convolution kernels whose number is the same as the corresponding convolution layers, and the denoised image is obtained after the second convolution kernels traverse a feature matrix of the denoised feature map.

4. The method according to claim 1, wherein the step of extracting a target area image corresponding to a shooting target from the denoised image comprises:

determining, by the target extraction network, an area where the shooting target resides in the denoised image, the target extraction network employing a convolution neural network; and isolating the area where the shooting target resides from the denoised image to obtain the target area image.

5. The method according to claim 1, wherein the step of performing detail enhancement on the target area image to generate a detail enhanced image comprises:

inputting the target area image into the detail enhancement network, using an output of the detail enhancement network as the detail enhanced image, the detail enhancement network employing a convolution-deconvolution neural network, and the detail enhanced image and the target area image having the same size.

6. The method according to claim 1, wherein the step of fusing the denoised image with the detail enhanced image to obtain an output image comprises:

replacing the target area image in the denoised image with the detail enhanced image; and linearly fusing a boundary area where the detail enhanced image intersects the denoised image.

7. The method according to claim 6, wherein the step of replacing the target area image in the denoised image with the detail enhanced image comprises:

implementing a replacement process through the following formula:

$$R\_final = aR\_206 + (1-a)R\_202$$

where R_final is the output image, R_206 is the detail enhanced image, R_202 is the denoised image, a is the area where the target area image resides in the denoised image, and 1−a is other area than the target area image in the denoised image.

8. The method according to claim 6, wherein the step of linearly fusing a boundary area where the detail enhanced image intersects the denoised image comprises:

linearly fusing the boundary area where the detail enhanced image intersects the denoised image by a smoothing filtering or wavelet reconstruction.

9. An electronic device, comprising:

an image acquisition assembly;

a memory; and a processor;

wherein the image acquisition assembly is configured to acquire image data;

wherein the memory stores thereon a computer program capable of being executed on the processor, wherein steps of an image processing method are carried out when the computer program is executed by the processor, the image processing method comprises:

obtaining a training image sample set, the training image sample set including a plurality of groups of paired training images;

training a noise reduction network, a target extraction network, or a detail enhancement network by using the training image sample set;

wherein each group of paired training images comprises: a first image and a second image respectively acquired in the same shooting environment, and wherein the first image is captured according to a set first exposure time and a set first sensitivity parameter; the second image is captured according to a set second exposure time and a set second sensitivity parameter; the second exposure time is greater than the first exposure time; the second sensitivity parameter is smaller than the first sensitivity parameter;

determining whether a light brightness in a current shooting environment is less than a set brightness threshold; and if yes, using a captured image as a to-be-processed image;

performing, by the noise reduction network, denoising on the to-be-processed image to generate a denoised image, extracting, by the target extraction network, a target area image corresponding to a shooting target from the denoised image, performing, by the detail enhancement network, detail enhancement on the target area image to generate a detail enhanced image, and fusing the denoised image with the detail enhanced image to obtain an output image.

10. The electronic device according to claim 9, wherein the step of performing denoising on a to-be-processed image to generate a denoised image carried out when the computer program is executed by the processor comprises:
  inputting the to-be-processed image into the noise reduction network, using an output of the noise reduction network as the denoised image, wherein the noise reduction network employs a convolution-deconvolution neural network, and wherein the denoised image and the to-be-processed image have the same size.

11. The electronic device according to claim 10, wherein the convolution-deconvolution neural network includes a convolution neural network and a deconvolution neural network;
  wherein the convolution neural network includes at least one convolution layer, each of the at least one convolution layer includes one or more first convolution kernels, and a denoised feature map is obtained after the first convolution kernels traverse a pixel matrix of the to-be-processed image;
  wherein the deconvolution neural network employs a structure symmetrical with the convolution neural network, the deconvolution neural network includes at least one deconvolution layer, each of the at least one deconvolution layer includes second convolution kernels whose number is the same as the corresponding convolution layers, and the denoised image is obtained after the second convolution kernels traverse a feature matrix of the denoised feature map.

12. The electronic device according to claim 9, wherein the step of extracting a target area image corresponding to a shooting target from the denoised image carried out when the computer program is executed by the processor comprises:
  determining, by the target extraction network, an area where the shooting target resides in the denoised image, wherein the target extraction network employs a convolution neural network, and
  isolating the area where the shooting target resides from the denoised image to obtain the target area image.

13. The electronic device according to claim 9, wherein the step of performing detail enhancement on the target area image to generate a detail enhanced image carried out when the computer program is executed by the processor comprises:
  inputting the target area image into the detail enhancement network, and
  using an output of the detail enhancement network as the detail enhanced image;
  wherein the detail enhancement network employs a convolution-deconvolution neural network, and the detail enhanced image and the target area image have the same size.

14. The electronic device according to claim 9, wherein the step of fusing the denoised image with the detail enhanced image to obtain an output image carried out when the computer program is executed by the processor comprises:
  replacing the target area image in the denoised image with the detail enhanced image, and
  linearly fusing a boundary area where the detail enhanced image intersects the denoised image.

15. The electronic device according to claim 14, wherein the step of replacing the target area image in the denoised image with the detail enhanced image carried out when the computer program is executed by the processor comprises:
  implementing a replacement process through the following formula:

$R\_final = aR\_206 + (1-a)R\_202$ where R_final is the output image, R_206 is the detail enhanced image, R_202 is the denoised image, a is the area where the target area image resides in the denoised image, and 1−a is other area than the target area image in the denoised image.

16. The electronic device according to claim 14, wherein the step of linearly fusing a boundary area where the detail enhanced image intersects the denoised image carried out when the computer program is executed by the processor comprises:
  linearly fusing a boundary area where the detail enhanced image intersects the denoised image by means of smoothing filtering or wavelet reconstruction.

17. A non-transitory computer-readable storage medium having stored thereon a computer program, wherein steps of an image processing method are carried out when the computer program is executed by a processor, the image processing method comprising:
  obtaining a training image sample set, the training image sample set including a plurality of groups of paired training images;
  training a noise reduction network, a target extraction network, or a detail enhancement network by using the training image sample set;
  wherein each group of paired training images comprises: a first image and a second image respectively acquired in the same shooting environment, and wherein the first image is captured according to a set first exposure time and a set first sensitivity parameter; the second image is captured according to a set second exposure time and a set second sensitivity parameter; the second exposure time is greater than the first exposure time; the second sensitivity parameter is smaller than the first sensitivity parameter;
  determining whether a light brightness in a current shooting environment is less than a set brightness threshold; and
  if yes, using a captured image as a to-be-processed image;
  performing, by the noise reduction network, denoising on the to-be-processed image to generate a denoised image;
  extracting, by the target extraction network, a target area image corresponding to a shooting target from the denoised image;
  performing, by the detail enhancement network, detail enhancement on the target area image to generate a detail enhanced image; and
  fusing the denoised image with the detail enhanced image to obtain an output image.

* * * * *